United States Patent
Neginhal et al.

(10) Patent No.: US 11,561,824 B2
(45) Date of Patent: Jan. 24, 2023

(54) EMBEDDED PERSISTENT QUEUE

(71) Applicant: VMware, Inc., Palo Alto, CA (US)

(72) Inventors: Srinivas Neginhal, Palo Alto, CA (US);
Medhavi Dhawan, Palo Alto, CA (US);
Gaurav Sharma, Mountain View, CA
(US); Rajneesh Bajpai, Palo Alto, CA
(US)

(73) Assignee: VMWARE, INC., Palo Alto, CA (US)

( * ) Notice: Subject to any disclaimer, the term of this patent is extended or adjusted under 35 U.S.C. 154(b) by 229 days.

(21) Appl. No.: 16/819,115

(22) Filed: Mar. 15, 2020

(65) Prior Publication Data
US 2021/0286647 A1    Sep. 16, 2021

(51) Int. Cl.
*G06F 9/46* (2006.01)
*G06F 9/48* (2006.01)
*G06F 11/30* (2006.01)
*G06F 9/50* (2006.01)
*G06F 11/34* (2006.01)

(52) U.S. Cl.
CPC .......... *G06F 9/4881* (2013.01); *G06F 9/5083* (2013.01); *G06F 11/302* (2013.01); *G06F 11/3495* (2013.01); *G06F 2209/485* (2013.01)

(58) Field of Classification Search
CPC . G06F 9/4881; G06F 9/5083; G06F 2209/485
See application file for complete search history.

(56) References Cited

U.S. PATENT DOCUMENTS

| | | | |
|---|---|---|---|
| 6,912,586 B1 * | 6/2005 | Achtermann | H04L 67/06 709/224 |
| 9,141,432 B2 * | 9/2015 | Chen | G06F 9/5044 |
| 9,191,299 B1 * | 11/2015 | Petit | G06Q 10/063114 |
| 2018/0204289 A1 * | 7/2018 | Bundy | G06Q 40/123 |
| 2018/0373771 A1 * | 12/2018 | Ashwood-Smith | G06F 12/06 |
| 2020/0236034 A1 * | 7/2020 | Smith | H04L 45/502 |

* cited by examiner

*Primary Examiner* — Camquy Truong
(74) *Attorney, Agent, or Firm* — Thomas Horstemeyer, LLP

(57) ABSTRACT

Various aspects are disclosed for distributed application management using an embedded persistent queue framework. In some aspects, task execution data is monitored from a plurality of task execution engines. A task request is identified. The task request can include a task and a Boolean predicate for task assignment. The task is assigned to a task execution engine embedded in a distributed application process if the Boolean predicate is true, and a capacity of the task execution engine is sufficient to execute the task. The task is enqueued in a persistent queue. The task is retrieved from the persistent queue and executed.

20 Claims, 4 Drawing Sheets

EMBEDDED PERSISTENT QUEUE

BACKGROUND

Enterprises can develop distributed applications that perform a task or service for enterprise users or enterprise customers. The enterprises can provide access to distributed applications that are hosted on data centers. Distributed applications achieve scale and availability goals by sharing their workload across the processes for those applications. Data centers include various physical and virtual components that can host applications and web services, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. Operating or managing a data center can involve maintaining hundreds to thousands of virtual machines as well as the hardware of host machines, which include CPUs, GPUs, and other physical hardware.

Some systems distribute tasks by dividing sets of hardware or domain entities within a management plane, and divvying tasks to managers for each entity. This can unduly imbalance tasks across the datacenter and can be sensitive to perturbations in a cluster membership. In addition, existing methods of task distribution fail to consider other tasks for the distributed applications that are executing or have executed within the datacenter. As a result, there is a need for more effective task distribution for distributed applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to distributed application management using an embedded persistent queue framework. Enterprises can utilize distributed applications to achieve scale and availability goals by sharing tasks across processes of those applications. Distributed application management services can fail to consider other tasks for the distributed application that are executing or have executed within the datacenter and can unduly imbalance tasks among the distributed application processes on each node or host. The present disclosure provides a solution through a management service that optimizes distributed application management using an embedded persistent queue framework.

Figure 1:
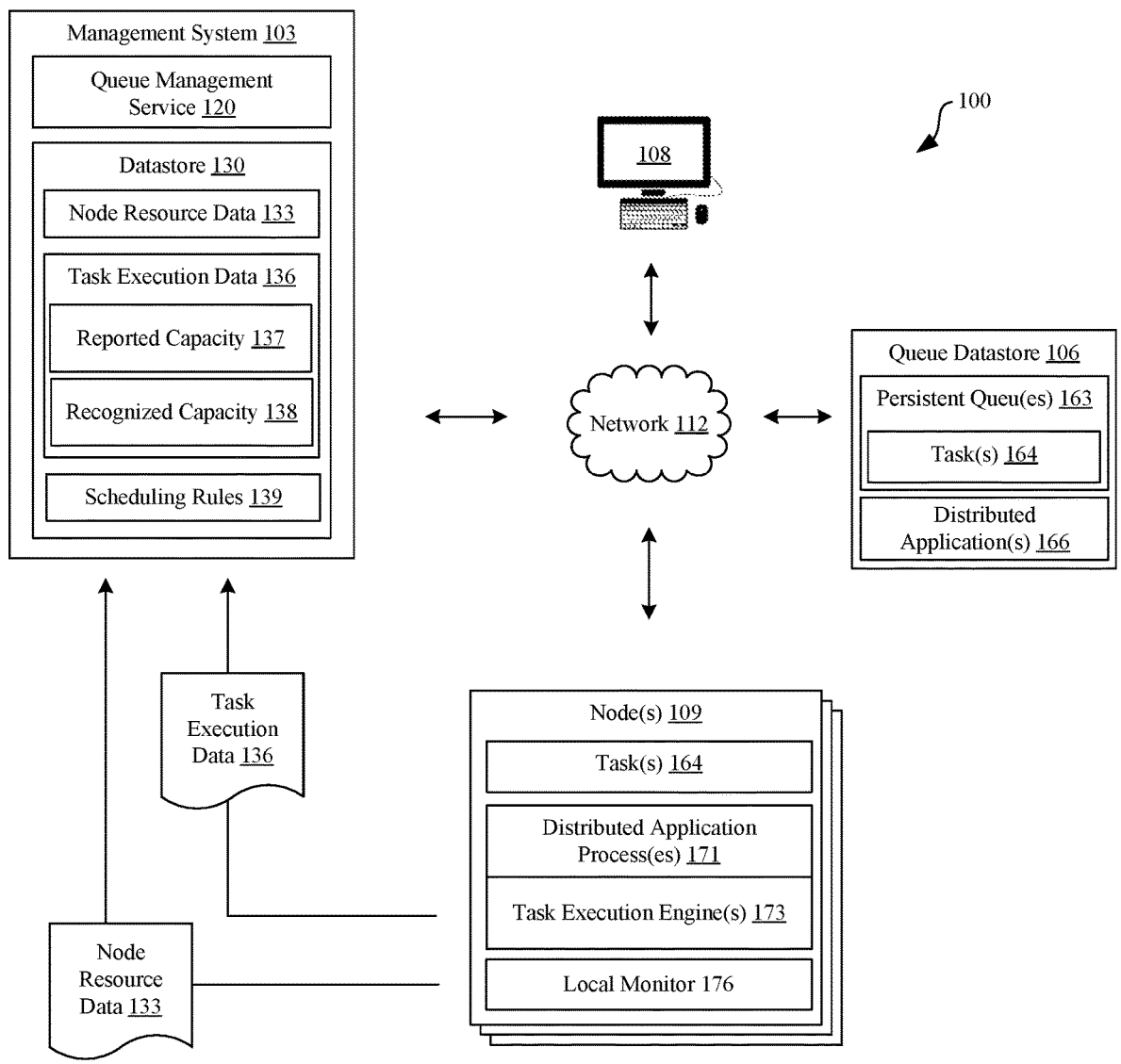
FIG. 1 is a drawing of an example of a networked computing environment that includes a management system, a queue datastore, and nodes for embedded persistent queueing.

Turning now to FIG. 1, an example of a networked environment 100 is shown. The networked environment 100 can include a management system 103, a queue datastore 106, client device(s) 108, and various hosts or nodes 109 in communication with one another over a network 112. The network 112 can include, for example, the Internet, intranets, extranets, wide area networks (WANs), local area networks (LANs), wired networks, wireless networks, other suitable networks, or any combination of two or more such networks.

The networks 112 can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

The management system 103 can include a server computer or any other system providing computing capability. The management system 103 can provide access to functions for each of a number of different enterprises. While referred to in the singular, the management system 103 can include a plurality of computing devices that are arranged in one or more server banks, computer banks, or other arrangements. The management system 103 can include a grid computing resource or any other distributed computing arrangement. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a queue management service 120 as well as other applications, services, processes, systems, engines, or functionality not discussed in detail herein. The queue management service 120 can be stored in the datastore 130 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, virtual appliances, and software, such as operating systems, drivers, hypervisors, scripts, and applications.

In some examples, a management system 103 can include a computing environment that includes hundreds or even thousands of physical machines, as well as virtual machines and other software implemented in devices stored in server racks, distributed geographically, and connected to one another through the network 112. It is understood that any virtual machine or other virtual appliance can be implemented using at least one physical device, such as a server or other computing device. The queue management service 120 can include a scheduler that assigns tasks 164 to task execution engines 173 for execution using resources represented by the nodes 109. The queue management service 120 can monitor node resource data 133 for the nodes 109 both during live workload operation as well as during load test operation. In some cases, the nodes 109 can include instructions to transmit the node resource data 133 to the queue management service 120. For example, the local monitor 176 of the node 109 can transmit node resource data 133 to the queue management service 120.

The datastore 130 can include memory of the management system 103, mass storage resources of the management system 103, or any other storage resources on which data can be stored by the management system 103. The datastore 130 can include memory and datastores for the nodes 109. For instance, the datastore 130 can include one or more relational databases, such as structure query language (SQL) databases, non-SQL databases, or other relational or non-relational databases. The data stored in the datastore 130, for example, can be associated with the operation of the various services or functional entities described below. The datastore 130 can include a database or other memory that includes, for example, the queue management service 120, as well as node resource data 133, task execution data 136, a reported capacity 137, a recognized capacity 138, scheduling rules 139, and other data.

The node resource data 133 can represent information related to a hardware resource used as a node 109 that executes a task 164. The node 109 can include a physical resource or virtual resource. The node resource data 133 can include information such as the amount of memory of the node 109, the number and type of processors of the node 109, the number and type of GPUs of the node 109, the number and type of network connections of the node 109, and various other data. The node resource data 133 can also include information related to the tasks 164 currently hosted or executed on the node 109. For example, the node resource data 133 can include a record of the number of distributed application processes 171, task execution engines 173, or tasks 164 hosted on one or more hardware resources comprising the node 109. These records can also include the number of processor cores, amount of memory, amount of storage, number of GPUs, and the number of network connections.

Node resource data 133 can include a total amount of computer resources that are allocated to a node 109. Node resource data 133 can include the amount or percentage of computer resources that are currently being utilized by the task 164, distributed application process 171, or node 109. For example, the node resource data 133 can include an indication that a node 109 is consuming 40% of the memory allocated to the node 109 and using 47% of the processor resources allocated to it. In some cases, the node resource data 133 can indicate that a first distributed application process 171 is consuming 30% of the memory allocated to the node 109 and 70% of the processor resources, while a second distributed application process 171 is consuming 50% of the memory and 25% of the processor resources. The local monitor 176 of a node 109 can collect the node resource data 133 for the node 109, and can transmit the node resource data 133 to the queue management service 120.

Task execution data 136 can represent information related to a task execution engine 173 of a distributed application process 171 executing on a node 109. A node 109 can execute multiple distributed application processes 171. The task execution engines 173 for each distributed application process 171 can collect or otherwise identify task execution data 136 and can transmit the task execution data 136 to the queue management service 120. For example, a task execution engine 173 can periodically report task execution data 136. The queue management service 120 can use the transmission of task execution data 136 as a heartbeat or indication of the operational status of the task execution engines 173.

Task execution data 136 can include a reported capacity 137 received from the task execution engine 173 of the distributed application process 171. The reported capacity 137 can include a number of slots, and a size of each slot. This task slot size can include a number of processors or another measure of processing for the task execution engine 173, as well as a measure of memory for the task execution engine 173. The reported capacity 137 can also include a number, fraction, or percentage of the slots that are currently in use by tasks 164 performed by the task execution engine 173. The reported capacity 137 can also include a number, fraction, or percentage of the slots that are currently vacant or open.

The queue management service 120 can also generate and store a recognized capacity 138. The recognized capacity 138 can be a capacity that the queue management service 120 recognizes when determining task assignments. The recognized capacity 138 can be the same as the reported capacity 137 or can be reduced to a fraction of the reported capacity 137, based on a comparison between actual node resource usage and a target node resource usage for the node 109. For example, if the target node resource usage is currently exceeded by actual usage, then the queue management service 120 can reduce the recognized capacity 138 to a fraction of the reported capacity 137. As usage returns to normal or falls equal to or under the target node resource usage, the queue management service 120 can increase the recognized capacity 138 over time until it reaches the reported capacity 137.

The scheduling rules 139 can include algorithms, metrics, and other rules for assigning tasks 164 to task execution engines 173. For example, the scheduling rules 139 can include a bin packing algorithm that selects an optimal task execution engine 173 for the task 164 based on the task execution data 136, the node resource data 133, a type of the task 164, and a weight of the task 164. In some cases, the bin packing algorithm can pack the most packed node 109 or task execution engine 173 first to exploit locality. In other cases, the bin packing algorithm can pack the least packed node 109 or task execution engine 173 first to balance the total workload across nodes 109. The type of task 164 can indicate which distributed application(s) 166 can perform the task 164. The task weight of the task 164 can indicate hardware resources sufficient to execute the task 164. The task weight of the task 164 can include a number of processors or another measure of processing for the task 164, as well as a measure of memory for the task 164. The scheduling rules 139 can indicate that the task 164 should be assigned to a task execution engine slot with a slot size greater than or equal to the task weight. Scheduling rules 139 can also indicate affinity rules including affinities or anti-affinities between various tasks 164. In some cases, a task request to perform the task 164 can include the affinity rules, and the queue management service 120 can store the affinity rules for future reference.

The queue datastore 106 can include a server computer or any other system providing computing capability, or a plurality of devices installed in racks which can make up a server bank, aggregate computing system, or a computer bank in a data center or other like facility. The queue datastore 106 can store persistent queues 163, tasks 164, distributed applications 166, and other data. The queue datastore 106 can expose persistent queue service Application Programming Interfaces (PQS APIs) that provide the ability to create a persistent queue 163, delete the persistent queue 163, get or retrieve the persistent queue 163, and list the persistent queues 163. The PQS APIs can also include task APIs to write, read, and remove tasks 164 from the queues. To this end, persistent queue service APIs can be embedded in each distributed application process 171 of a distributed application 166.

The persistent queues 163 can be uniquely identified by a namespace identifier and a queue name or identifier. Each persistent queue 163 in a particular namespace can include a unique queue name. In some examples, a user of a client device 108 can utilize a "create queue" method of a PQS API. The create queue method or API can take a "create request" object as an argument. The create request object can specify or indicate a namespace and a queue name of a persistent queue 163 to create. The create request object can also indicate other attributes of the persistent queue 163. The queue datastore 106 can return a reference to the persistent queue 163 once created. If a persistent queue 163 with the specified queue name already exists in the specified namespace, the queue datastore 106 can return a reference to the existing persistent queue 163. In some examples, a persistent queue 163 can be uniquely associated with a particular node 109 and/or a particular task execution engine 173. The local monitor 176 for a node 109 can retrieve the tasks 164 within its persistent queue 163, or all persistent queues 163 for the task execution engines 173 on the node 109. Alternatively, each task execution engine 173 on a node 109 can retrieve tasks 164 for the persistent queue 163 associated with that task execution engine 173.

The tasks 164 can include Function as a Service, Software as a Service, and other workloads that can be invoked and instantiated on demand for an enterprise. For example, a task 164 can include code that receives an input and performs an action or transforms the input into a desired output. The tasks 164 can be performed by distributed applications 166, in other words by the distributed application processes 171 that make up a distributed application 166.

The distributed applications 166 can define, specify, or include the distributed application processes 171. In some examples, the distributed application processes 171 can include identical instances of the distributed application 166. In other cases, a number of different types of distributed application processes 171 can be executed separately as part of the distributed application 166.

A task execution engine 173 can be embedded in each distributed application processes 171. The task execution engine 173 can include or specify a library that provides PQS APIs. The task execution engine 173 can periodically transmit task execution data 136 including a reported capacity 137 of the task execution engine 173 or the distributed application processes 171 to the queue management service 120. The local monitor 176 of a node 109 can collect the node resource data 133 for the node 109, and can transmit the node resource data 133 to the queue management service 120.

The nodes 109 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as virtual machines or other software. Each node 109 can be assigned to a namespace or logical group that includes one or more nodes 109.

The components executed on the management system 103 can include, for example, a queue management service 120 as well as other applications, services, processes, systems, engines, or functionality not discussed in detail herein. The queue management service 120 can be executed to oversee the operation of the networked environment 100 through management of the nodes 109 as well as the physical and virtual computing resources that make up the nodes 109. In some examples, an enterprise, organization, or other entity can operate the queue management service 120 to oversee or manage the operation of devices in racks, such as servers, switches, datastores, CPUs, GPUs, power supplies, cooling systems, and other components.

Figure 2:
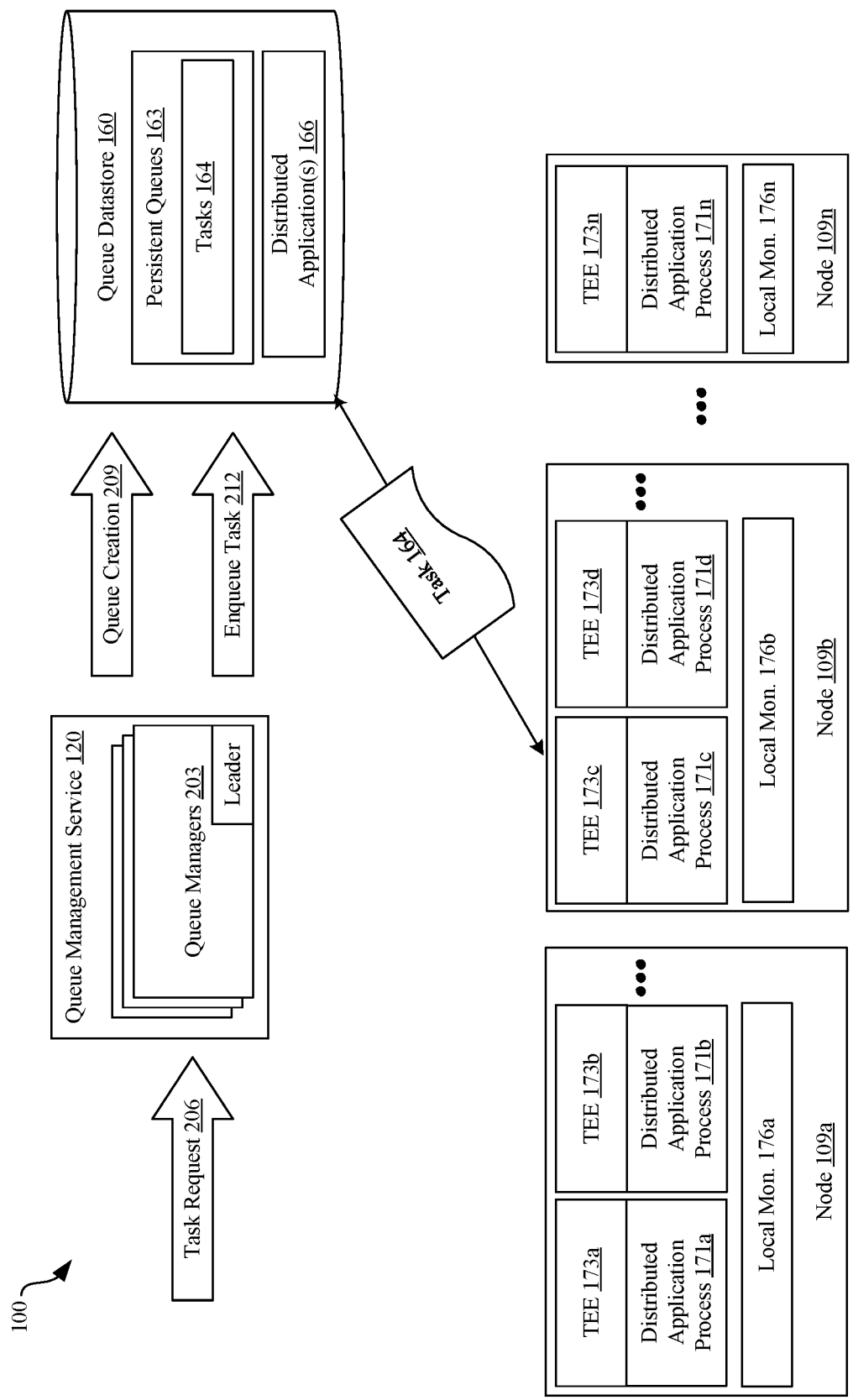
FIG. 2 is a drawing of an example of task assignment within the networked computing environment of FIG. 1.

FIG. 2 provides an example of task assignment in the networked environment 100. In this example, the nodes 109 can include nodes 109a, 109b . . . 109n. The node 109a can include a number of distributed applications processes 171, including the distributed applications processes 171a and 171b and the local monitor 176a. Any number of distributed application processes 171 can be executed on a node 109, but the node can include a single local monitor 176. A task execution engine 173a can be embedded in the distributed applications process 171a. A task execution engine 173b can be embedded in the distributed applications process 171b.

The node 109b can include the distributed applications processes 171c and 171d and the local monitor 176b. A task execution engine 173c can be embedded in the distributed applications process 171c. A task execution engine 173d can be embedded in the distributed applications process 171d. The node 109n can include the distributed applications process 171n and the local monitor 176n. A task execution engine 173n can be embedded in the distributed applications process 171n. The queue management service 120 can include a number of queue managers 203 that work in concert to provide the queue management service 120. One of the queue managers 203 can be specified as the leader. In some cases, the queue managers 203 can be executed by a predetermined subset of the nodes 109.

The queue management service 120 can receive a task request 206. The task request 206 can specify a task 164 and a Boolean predicate that should be true in order to assign the task 164 to a task execution engine 173 and place the task 164 in a persistent queue 163. In some cases, the task request 206 can specify a particular persistent queue 163 by its associated node 109, or by queue name and namespace. Alternatively, the queue management service 120 can identify an appropriate persistent queue 163 for the task 164. For example, the task 164 can be a type of task for a particular distributed application 166, and the queue management service 120 can identify a persistent queue 163 for the particular distributed application 166 or the task type. The task type can be specified in the task request 206, or the queue management service 120 can analyze the task 164 to identify the task type. The queue management service 120 can also transmit a queue creation request 209 to create a persistent queue 163 in response to the task request 206, for example, if an appropriate persistent queue 163 does not exist.

The queue management service 120 can assign the task 164 to the task execution engine 173c of the distributed application process 171c. The queue management service 120 can transmit an enqueue task request 212 to add the task 164 to the persistent queue 163. The task 164 can be stored in the persistent queue 163 in association with an assigned node 109, task execution engine 173, distributed application process 171, and other information. In some cases, the queue management service 120 can also transmit a task assignment request or command to the task execution engine 173c. The local monitor 176b or task execution engine 173c can retrieve the task 164 from the queue datastore 106 in response to retrieving a task request 206.

Figure 3:
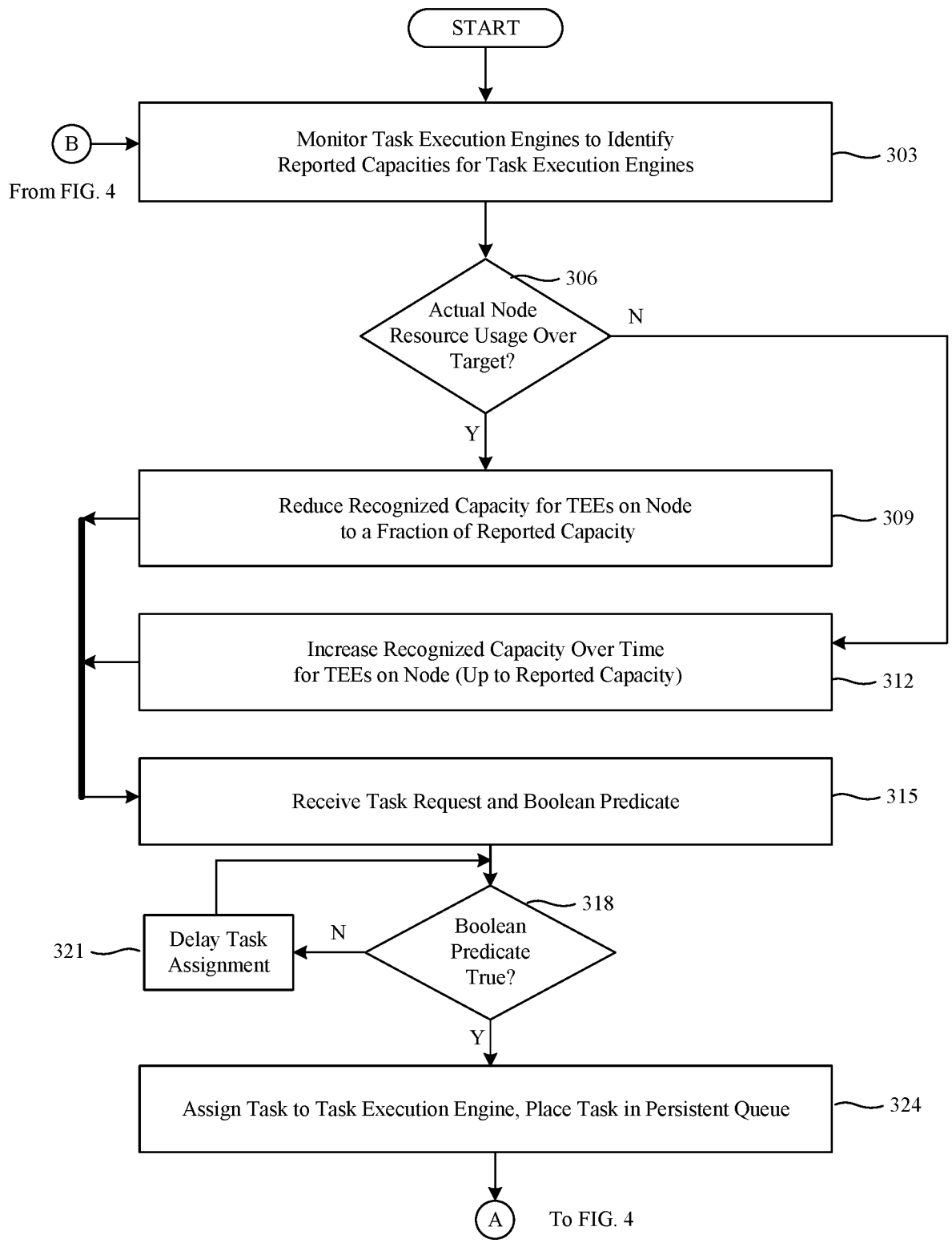
FIG. 3 is a flowchart illustrating examples of functionalities implemented by components of the networked computing environment of FIG. 1.

Moving to FIG. 3, shown is a flowchart that provides one example of the operation of a portion of the networked environment 100. The flowchart 300 can be viewed as depicting an example of elements of a method implemented by the queue management service 120 in concert with the other elements of the networked environment 100. The ordering, separation, or segmentation of functionality as discussed herein is presented for illustrative purposes only.

In step 303, the queue management service 120 can monitor task execution engines 173 to identify their reported compute capacities 137. Each task execution engine 173 can transmit task execution data 136 to the queue management service 120. The queue management service 120 can receive and store the task execution data 136, which can include reported compute capacities 137 for the task execution engines 173. The queue management service 120 can also store a timestamp that indicates the time the task execution data 136 was received, or a time the task execution data 136 was transmitted. A transmission timestamp can be included in the task execution data 136 transmitted to the queue management service 120.

The reported capacity 137 of the task execution engine 173 can specify a number of task slots that represent a measure of capacity. A task slot size can also be specified. The task slot size can indicate a measure of processing resources and measure of memory resources for the task execution engine 173. The reported capacity 137 can also indicate a number, fraction, or percentage of the slots that are currently in use by tasks 164 performed by the task execution engine 173. The reported capacity 137 can also include a number, fraction, or percentage of the slots that are currently vacant or open. The task execution engine 173 can transmit task execution data 136 that indicates a task or tasks 164 that are currently running, and those that have recently completed execution on the task execution engine 173. A transmission of task execution data 136 can include a task execution engine identifier of the task execution engine 173 and a node identifier of the node 109. The queue management service 120 can maintain and expose a network endpoint through which the task execution engine 173 can submit the task execution data 136.

In step 306, the queue management service 120 can determine whether actual node resource usage is over a target resource usage for the node 109. The datastore 130 can store a predetermined or user-selected target resource usage for each node 109. The queue management service 120 can also determine the target resource usage based on service-level agreements (SLAs).

The queue management service 120 can receive transmissions of node resource data 133 from a local monitor 176 for each node 109. The queue management service 120 can maintain and expose a network endpoint through which the local monitor 176 can submit the node resource data 133. The node resource data 133 transmission can include a node identifier and a namespace identifier for the node 109. Node resource data 133 can include a total amount of computer resources that are allocated to a node 109, as well as an amount or percentage of computer resources that are currently being utilized by the node 109. The queue management service 120 can identify an actual node resource usage and compare it to the target resource usage for the node 109. If the actual resource usage is greater than the target resource usage, then the queue management service 120 can move to step 309. If the actual resource usage is not greater than the target resource usage, then the queue management service 120 can move to step 312.

In step 309, the queue management service 120 can reduce the respective recognized capacities 138 for the task execution engines 173 on the node 109, to a fraction of their advertised or reported capacities 137. For example, the queue management service 120 can identify that a reported capacity 137 includes a reported number of task slots and can reduce the reported number of slots to a fraction of the original number. The recognized capacity 138 can include the reduced number of slots. The queue management service 120 can identify that a reported capacity 137 includes a reported task slot size and can reduce the reported task slot size to a fraction of the original size. The recognized capacity 138 can include the reduced task slot size. The queue management service 120 can linearly or exponentially reduce the fraction of the reported capacity 137 that is considered for scheduling based on a number of time periods or the total time that the actual resource usage is greater than the target resource usage.

In step 312, the queue management service 120 can increase the recognized capacity 138 over time. The recognized capacity 138 can be increased up to the reported capacity 137. The queue management service 120 can linearly or exponentially increase the recognized capacity 138 over time based on the number of time periods or the total time that the actual resource usage is less than or equal to the target resource usage.

In step 315, the queue management service 120 can receive or identify a task request 206. The task request 206 can be received from a client device 108 or can be identified based on an increased demand for a particular task 164 or functionality provided by a distributed application 166. The task request 206 can include a task 164 and a Boolean predicate. In some cases, the task request 206 can specify a particular persistent queue 163 by queue name and namespace. Alternatively, the queue management service 120 can identify an appropriate persistent queue 163 for the task 164. For example, the task 164 can be a type of task for a particular distributed application 166, and the queue management service 120 can identify a persistent queue 163 for the particular distributed application 166 or the task type. The task type can be specified in the task request 206, or the queue management service 120 can analyze the task 164 to identify the task type. The queue management service 120 can also create a persistent queue 163 in response to the task request 206, for example, if an appropriate persistent queue 163 does not exist.

In step 318, the queue management service 120 can determine whether the Boolean predicate is true. For example, the Boolean predicate can be utilized to orchestrate complex business systems that can have numerous prerequisites. The Boolean predicate can specify requirements including completion of pre-requisite tasks 164, concurrently executing tasks 164, affinity rules, hardware requirements, node 109 requirements, a required set of distributed application processes 171 on the node 109, and other requirements. The affinity rules can include affinities and anti-affinities between the task 164 and other tasks 164, between the task 164 and nodes 109, and between the task 164 and the distributed application processes 171. The queue management service 120 can determine whether the Boolean predicate is true based on an analysis of the node resource data 133, task execution data 136, scheduling rules, and other information. If the Boolean predicate is false, the process can move to step 321 and the queue management service 120 can delay task assignment for a predetermined time before again checking whether the Boolean predicate is satisfied. If the Boolean predicate is true, then the process can move to step 324.

In step 324, the queue management service 120 can assign the task 164 to a task execution engine 173 and place the task 164 in a persistent queue 163. For example, the queue management service 120 can transmit an enqueue task request 212 to the queue datastore 106. The queue datastore 106 can enqueue the task 164 in a persistent queue 163 for the node 109 or task execution engine 173. In some cases, the persistent queue 163 can store the task 164 in association with an assigned node 109, task execution engine 173, distributed application process 171, and other information. The queue management service 120 can also notify the task execution engine 173 that it is assigned a particular task, 164 by transmitting a task assignment command to the selected task execution engine 173.

The queue management service 120 can select an appropriate task execution engine 173 by comparing the properties of the task 164 to a recognized capacity 138 for each task execution engine 173. For example, the task 164 can include a task type and a task weight. The queue management service 120 can select a task execution engine 173 that includes an available recognized slot with a recognized slot size greater than or equal to the task weight. The queue management service 120 can select a task execution engine 173 that is embedded in a distributed application process 171 that can perform the task type. The queue management service 120 can also consider Boolean predicates including affinities and anti-affinities between various tasks 164. The queue management service 120 can identify a set of candidate task execution engines 173 that satisfy the task type and a task weight and select a task execution engine 173 from the set based on the scheduling rules 139. The connector A can connect to the flowchart of FIG. 4, and the connector B can connect from the flowchart of FIG. 4.

Figure 4:
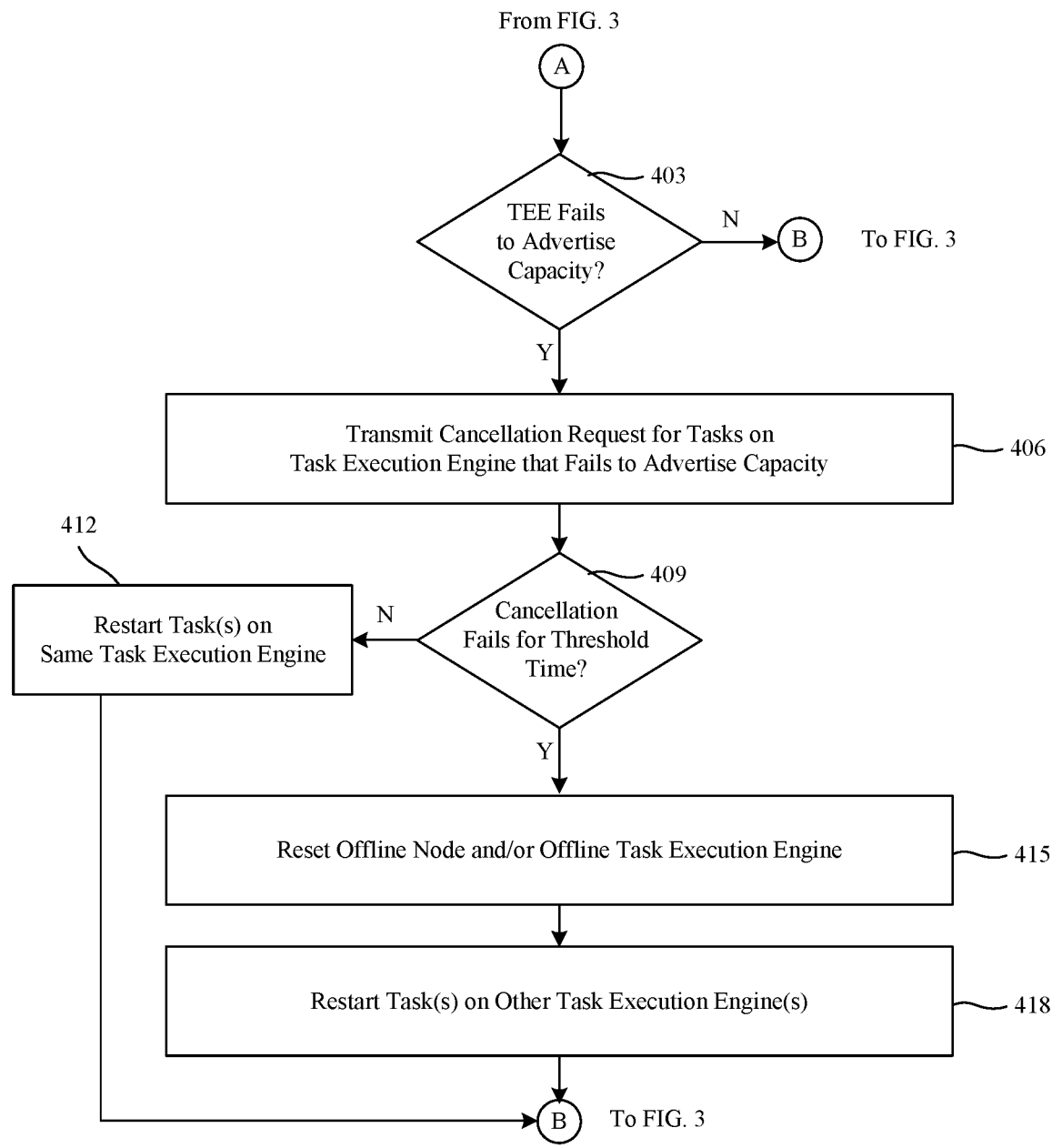
FIG. 4 is a flowchart illustrating examples of functionalities implemented by components of the networked computing environment of FIG. 1.

Moving to FIG. 4, shown is a flowchart that continues the example of the operation of the networked environment 100 provided by the flowchart 300 of FIG. 3. The flowchart 400 can be viewed as depicting an example of elements of a method implemented by the queue management service 120 in concert with the other elements of the networked environment 100. The ordering, separation, or segmentation of functionality as discussed herein is presented for illustrative purposes only.

In step 403, the queue management service 120 can identify whether a task execution engine 173 has failed to advertise a reported capacity 137. For example, each task execution engine 173 can transmit task execution data 136 to the queue management service 120 periodically or according to a schedule. The queue management service 120 can record a time for each task execution data 136 transmission. The queue management service 120 can compare a current task execution data transmission time to a previous task execution data transmission time. In some cases, each task execution data transmission includes a timestamp, and the timestamps can be compared to a threshold reporting time. If the threshold reporting time has elapsed, then the process can move to step 406. If not, the process can move to connector B, which connects to flowchart 300 of FIG. 3.

In step 406, the queue management service 120 can transmit a cancellation request to the task execution engine 173 that fails to report its capacity or provide task execution data 136. The queue management service 120 can determine that the task execution engine 173 has crashed, stalled, or otherwise failed based on its failure to provide task execution data 136. If the task execution engine 173 has failed, it is possible that the tasks 164 currently executed on the task execution engine 173 will not be completed. This can prevent completion of Boolean predicates for additional tasks 164. As a result, the queue management service 120 can cancel all tasks 164, in all slots, of that task execution engine 173.

In step 409, the queue management service 120 can determine whether the cancellation request has failed for a predetermined threshold time, or if the cancellation request is successful. In some cases, a separate cancellation request can be submitted for each task 164 of the task execution engine 173, and in other cases all of the tasks 164 can be cancelled in a single task cancellation request. The cancellation request can specify a task identifier for a task 164. If the cancellation request is successful, the process can move to step 412. If the cancellation request has failed for the predetermined threshold time, then the process can move to step 415. The queue management service 120 can determine that the cancellation request is successful if the task execution engine 173 returns a confirmation that a cancellation of one or more task(s) 164 is complete.

In step 412, the queue management service 120 can restart the cancelled tasks 164 on the same task execution engine 173. The queue management service 120 can identify a set of cancelled tasks 164 based on the tasks 164 previously assigned to execute in the task execution engine 173. This set of cancelled tasks 164 can include all tasks 164 that were successfully cancelled. The Boolean predicates for each of the tasks 164 will already be true, and the task weight and task type are satisfied by the task execution engine 173, so the tasks 164 can be restarted on the same task execution engine 173.

In step 415, the queue management service 120 can reset the task execution engine 173. In some cases, the queue management service 120 can also reset the node 109. For example, if one task execution engine 173 has failed to report and has failed to cancel tasks 164, the queue management service 120 can determine that the task execution engine 173 is offline. In some cases, this can also indicate that the node 109 is offline. For example, if all of the task execution engines 173 of the node 109 have failed to report task execution data 136, the queue management service 120 can determine that the node 109 is offline. Also, if the local monitor 176 also fails to report node resource data 133 for a threshold period of time, then the queue management service 120 can determine that the node 109 is offline. However, if another task execution engine 173 on the node 109 continues to report task execution data 136, or if the local monitor 176 continues to report node resource data 133, then the node 109 can be identified as online. The queue management service 120 can reset or restart offline task execution engines 173 and offline nodes 109 that are identified.

In step 418, the queue management service 120 can restart the cancelled tasks 164 on another task execution engine 173. The queue management service 120 can reevaluate the scheduling rules 139 and reassign the cancelled task 164 to another task execution engine 173. In some cases, this can include removing the task 164 from a previous persistent queue 163 and placing the task 164 in another persistent queue 163 for another node 109 or task execution engine 173. The Boolean predicates for the cancelled task 164 can already be true, so in some cases, the cancelled task 164 is reassigned and restarted by another task execution engine 173 without placing the cancelled task 164 in another persistent queue 163. If the node 109 was identified as offline and restarted, a cancelled task 164 can be restarted on a task execution engine 173 that is on another node 109. The connector B can connect back to the flowchart 300 of FIG. 3.

Stored in the memory device are both data and several components that are executable by the processor. Also stored in the memory can be a datastore 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the queue management service 120. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the queue management service 120 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system comprising:
at least one computing device comprising at least one processor;

a memory comprising executable instructions, wherein the instructions, when executed by the at least one processor, cause the at least one computing device to at least:

receive, by a queue management service, task execution data from a plurality of task execution engines, the task execution data comprising reported capacities for the plurality of task execution engines;

receive, by the queue management service, a task request comprising a task and a Boolean predicate for task assignment;

perform, by the queue management service, a node resource comparison that compares an actual resource usage for a node to a target resource usage for the node;

store, by the queue management service, a recognized capacity for a task execution engine based at least in part on the node resource comparison, wherein the recognized capacity is reduced to a fraction of a reported capacity for the task execution engine based at least in part on a number of time periods that the actual resource usage exceeds the target resource usage for the node that executes the task execution engine;

transmit, by the queue management service to a queue datastore service, an enqueue task request that specifies the task, and the task execution engine of the plurality of task execution engines, wherein the task execution engine is embedded in a distributed application process executed by the node, and the task is assigned based on an analysis of the task execution data that indicates: the Boolean predicate is true, and the recognized capacity of the task execution engine is sufficient to execute the task;

enqueue, by the queue datastore service, the task in a persistent queue stored by the queue datastore service; and execute, by the node, the task in the distributed application process, wherein the node retrieves the task from the persistent queue.

2. The system of claim 1, wherein the task is retrieved from the persistent queue by at least one of: the task execution engine, and a local monitor for the node.

3. The system of claim 1, wherein the actual resource usage of the node is received from a local monitor executed on the node.

4. The system of claim 3, wherein the actual resource usage comprises an amount or percentage of computer resources that is utilized by the node.

5. The system of claim 3, wherein the local monitor reports the actual resource usage along with an indication of the computer resources that are allocated to the node.

6. The system of claim 1, wherein the node executes multiple task execution engines.

7. The system of claim 1, wherein the persistent queue is unique to the task execution engine or a local monitor that reports resource usage for the node.

8. A non-transitory computer-readable medium, comprising executable instructions, wherein the instructions, when executed by at least one processor, cause at least one computing device to at least:

receive, by a queue management service, task execution data from a plurality of task execution engines, the task execution data comprising reported capacities for the plurality of task execution engines;

receive, by the queue management service, a task request comprising a task and a Boolean predicate for task assignment;

perform, by the queue management service, a node resource comparison that compares an actual resource usage for a node to a target resource usage for the node;

store, by the queue management service, a recognized capacity for a task execution engine based at least in part on the node resource comparison, wherein the recognized capacity is reduced to a fraction of a reported capacity for the task execution engine based at least in part on a number of time periods that the actual resource usage exceeds the target resource usage for the node that executes the task execution engine;

transmit, by the queue management service to a queue datastore service, an enqueue task request that specifies the task, and the task execution engine of the plurality of task execution engines, wherein the task execution engine is embedded in a distributed application process executed by the node, and the task is assigned based on an analysis of the task execution data that indicates: the Boolean predicate is true, and the recognized capacity of the task execution engine is sufficient to execute the task;

enqueue, by the queue datastore service, the task in a persistent queue stored by the queue datastore service; and execute, by the node, the task in the distributed application process, wherein the node retrieves the task from the persistent queue.

9. The non-transitory computer-readable medium of claim 8, wherein the task is retrieved from the persistent queue by at least one of: the task execution engine, and a local monitor for the node.

10. The non-transitory computer-readable medium of claim 8, wherein the actual resource usage of the node is received from a local monitor executed on the node.

11. The non-transitory computer-readable medium of claim 10, wherein the actual resource usage comprises an amount or percentage of computer resources that is utilized by the node.

12. The non-transitory computer-readable medium of claim 10, wherein the local monitor reports the actual resource usage along with an indication of the computer resources that are allocated to the node.

13. The non-transitory computer-readable medium of claim 8, wherein the node executes multiple task execution engines.

14. The non-transitory computer-readable medium of claim 8, wherein the persistent queue is unique to the task execution engine or a local monitor that reports resource usage for the node.

15. A method implemented by instructions executed by at least one computing device, the method comprising:

receiving, by a queue management service, task execution data from a plurality of task execution engines, the task execution data comprising reported capacities for the plurality of task execution engines;

receiving, by the queue management service, a task request comprising a task and a Boolean predicate for task assignment;

performing, by the queue management service, a node resource comparison that compares an actual resource usage for a node to a target resource usage for the node;

storing, by the queue management service, a recognized capacity for a task execution engine based at least in part on the node resource comparison, wherein the recognized capacity is reduced to a fraction of a reported capacity for the task execution engine based at least in part on a number of time periods that the actual resource usage exceeds the target resource usage for the node that executes the task execution engine;

transmitting, by the queue management service to a queue datastore service, an enqueue task request that specifies the task, and the task execution engine of the plurality of task execution engines, wherein the task execution engine is embedded in a distributed application process executed by the node, and the task is assigned based on an analysis of the task execution data that indicates: the Boolean predicate is true, and the recognized capacity of the task execution engine is sufficient to execute the task;

enqueuing, by the queue datastore service, the task in a persistent queue stored by the queue datastore service; and executing, by the node, the task in the distributed application process, wherein the node retrieves the task from the persistent queue.

16. The method of claim 15, wherein the task is retrieved from the persistent queue by at least one of: the task execution engine, and a local monitor for the node.

17. The method of claim 15, wherein the actual resource usage of the node is received from a local monitor executed on the node.

18. The method of claim 17, wherein the actual resource usage comprises an amount or percentage of computer resources that is utilized by the node.

19. The method of claim 17, wherein the local monitor reports the actual resource usage along with an indication of the computer resources that are allocated to the node.

20. The method of claim 15, wherein the persistent queue is unique to the task execution engine or a local monitor that reports resource usage for the node.

* * * * *